UNITED STATES PATENT OFFICE.

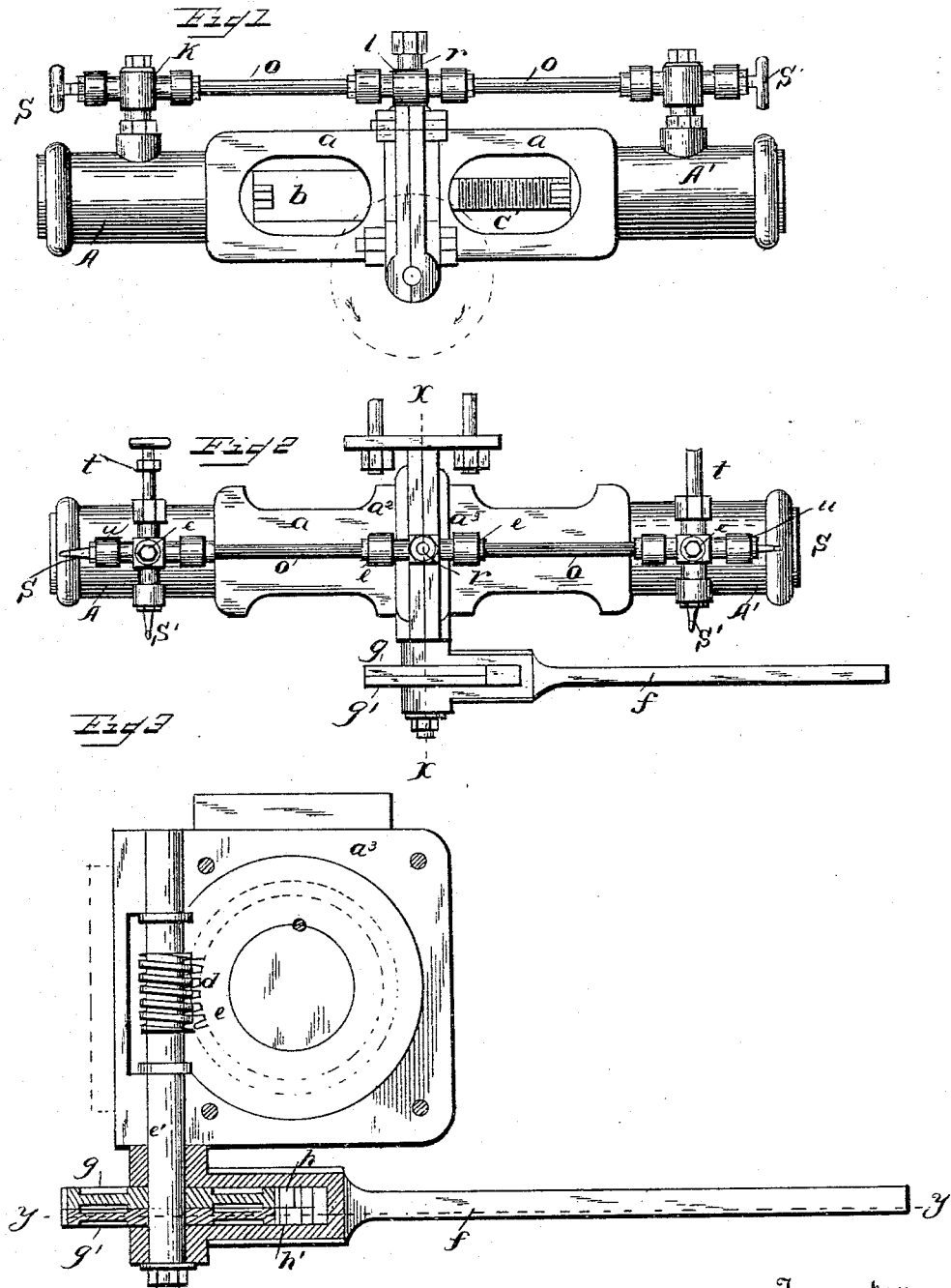

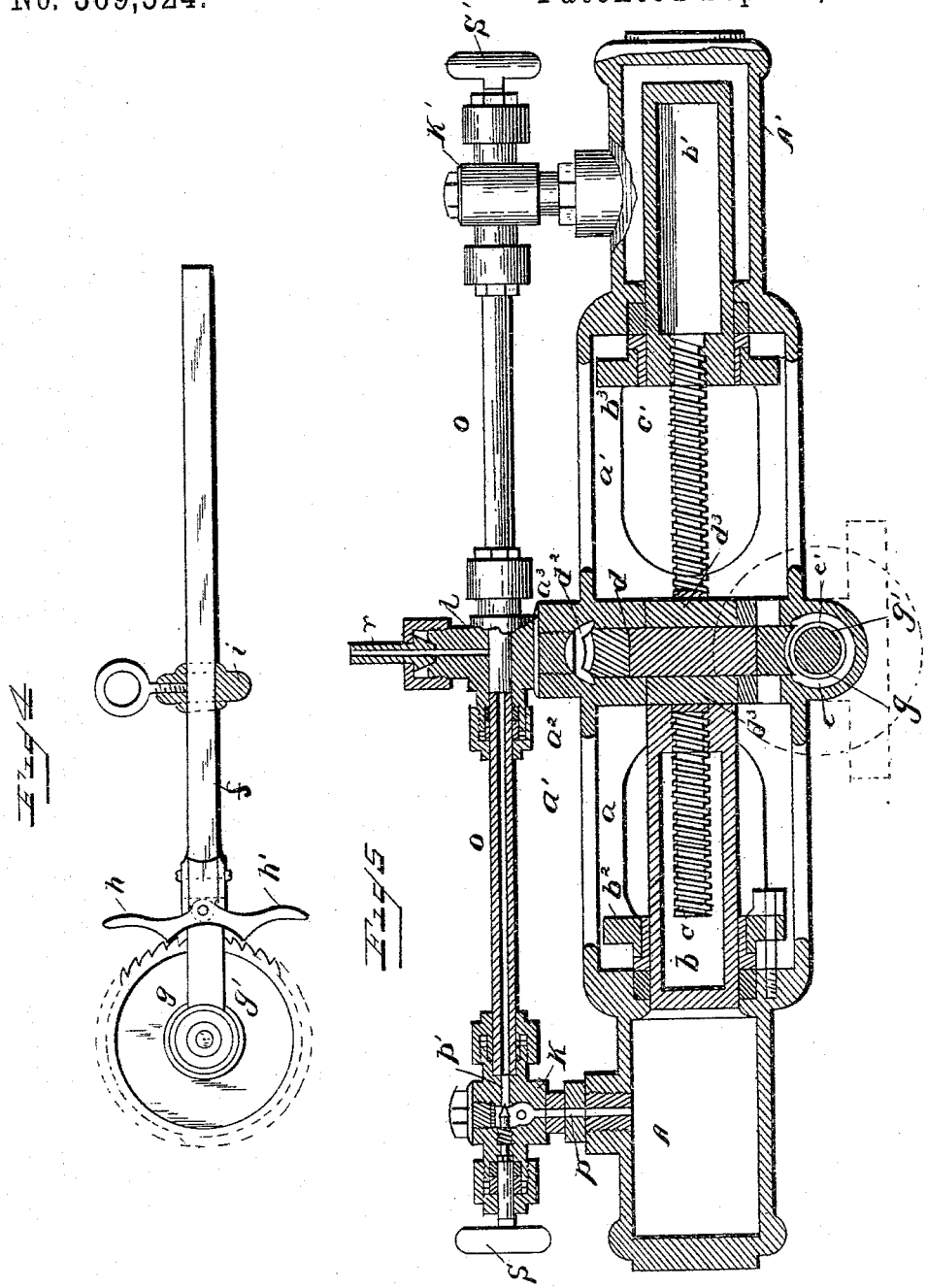

PHILIPP HUBERT, OF BUDA-PESTH, AUSTRIA-HUNGARY.

AUTOMATIC OIL-INJECTOR.

SPECIFICATION forming part of Letters Patent No. 369,524, dated September 6, 1887.

Application filed March 23, 1887. Serial No. 232,116. (No model.)

*To all whom it may concern:*

Be it known that I, PHILIPP HUBERT, a subject of the Emperor of Austria-Hungary, residing at Buda-Pesth, in the Empire of Austria-Hungary, have invented a new and useful Improvement in Automatic Oil - Injectors, of which the following is a clear and exact description, reference being had to the accompanying drawings, forming a part of this specification.

The object of my invention is to produce an automatic device for injecting oil to different parts of machinery, (especially locomotives and steamers,) said device being operated by the machinery itself.

Referring to the drawings, Figure 1 is a side elevation of my improved device. Fig. 2 is a plan view of the same. Fig. 3 is a sectional view on line $x\,x$, Fig. 2. Fig. 4 is a sectional view on line $y\,y$, Fig. 3. Fig. 5 is a plan sectional view.

A A' are two cylinders with hollow cylindrical end pieces, $a'\,a'$, having flanges $a^2\,a^3$. These two cylinders are fastened together by bolts $a$, passing through holes in the flanged ends $a^2\,a^3$.

$b\,b'$ are two pistons working in the interior of the cylinders A A' and passing through stuffing-boxes $b^2\,b^3$.

$d$ is a worm-wheel placed in recess $d^2$ and revolving on hubs $d^3$.

$c\,c'$ are two screws fastened at their inner ends to the hubs $d'$ of the worm-wheel $d$, and the outer ends passing through the threaded holes in the ends of the pistons. This worm-wheel is turned by the worm $e$ on shaft $e'$, situated as shown. On shaft $e'$ are keyed two ratchet-wheels, $g\,g'$, actuated in opposite directions by the double pawl $h\,h'$, secured to the operating-lever $f$, which may be operated by hand or by a rope attached to the ring $i$, secured onto the rod. The to-and-fro movement of the bar causes the pistons to move inward and outward. This movement of the pistons forces the oil contained in the cylinders up through connections $k\,k'$, having passages $p\,p'$, leading into tubes $o$. These tubes are placed between the connections $k\,k'$ and the center connection, $l$. After the oil leaves the tubes it enters the outlet-tube $r$, from whence it is conveyed by pipes to any part of the machinery.

S S' are valves regulating by screw-points the flow of oil through passages $p\,p'$, tube $o$, and pipes $t$ and $r$ from the reservoir into the cylinders, and vice versa.

$t$ are inlet-pipes leading into the connections $k\,k'$ and provided with valves $s'$. These inlet-pipes $t$ are used to suck oil from the supply-reservoir (not shown) into the cylinders. By this arrangement the oil can be automatically drawn from the supply-reservoir into the cylinder and carried to any part of the machinery.

Having thus described my invention, I desire to claim—

In a force-feed lubricator consisting, essentially, of two flanged hollow cylinders fastened together and having suitable inlet and outlet pipes, connecting-tubes, and oil-passages, with screw-threaded pistons working differentially in the interior of said cylinders, the operating-lever $f$, ratchet-wheels $g\,g'$, and pawls $h\,h'$, in combination with shaft $e'$, worm $e$, and recessed worm-wheel $d$, revolving on hubs $d^3$, all constructed and operating substantially as set forth.

In witness whereof I have hereunto signed my name in the presence of two subscribing witnesses.

PHILIPP HUBERT.

Witnesses:
 HENRY STERNE,
 ARTHUR ADLER.